(12) United States Patent
Burnett et al.

(10) Patent No.: US 9,191,713 B2
(45) Date of Patent: Nov. 17, 2015

(54) METHOD FOR GENERATING AND USING A VIDEO-BASED ICON IN A MULTIMEDIA MESSAGE

(76) Inventors: William R. Burnett, Menlo Park, CA (US); Andrew Butler, Palo Alto, CA (US)

( * ) Notice: Subject to any disclaimer, the term of this patent is extended or adjusted under 35 U.S.C. 154(b) by 199 days.

(21) Appl. No.: 13/602,180

(22) Filed: Sep. 2, 2012

(65) Prior Publication Data

US 2013/0060875 A1    Mar. 7, 2013

Related U.S. Application Data

(60) Provisional application No. 61/530,679, filed on Sep. 2, 2011.

(51) Int. Cl.
| | | |
|---|---|---|
| *G06Q 10/10* | (2012.01) | |
| *G06Q 30/02* | (2012.01) | |
| *H04L 12/58* | (2006.01) | |
| *H04M 1/725* | (2006.01) | |
| *G06T 13/80* | (2011.01) | |
| *H04N 21/4788* | (2011.01) | |
| *G06F 3/0488* | (2013.01) | |
| *H04N 21/4402* | (2011.01) | |

(52) U.S. Cl.
CPC ........ *H04N 21/4788* (2013.01); *H04L 12/5845* (2013.01); *G06F 3/0488* (2013.01); *G06Q 10/107* (2013.01); *G06Q 30/02* (2013.01); *G06T 13/80* (2013.01); *H04L 12/581* (2013.01); *H04L 51/04* (2013.01); *H04M 1/72544* (2013.01); *H04N 21/4402* (2013.01)

(58) Field of Classification Search
None
See application file for complete search history.

(56) References Cited

U.S. PATENT DOCUMENTS

| | | | | |
|---|---|---|---|---|
| 7,676,142 | B1* | 3/2010 | Hung | 386/233 |
| 7,697,668 | B1* | 4/2010 | Ostermann et al. | 379/100.08 |
| 8,059,097 | B2* | 11/2011 | Duarte et al. | 345/169 |
| 8,489,452 | B1* | 7/2013 | Warner et al. | 705/14.38 |
| 8,739,019 | B1* | 5/2014 | Nevins | 715/203 |
| 2002/0077135 | A1* | 6/2002 | Hyon | 455/466 |
| 2005/0156873 | A1* | 7/2005 | Walter et al. | 345/156 |
| 2005/0163379 | A1* | 7/2005 | Zimmermann | 382/190 |
| 2005/0261031 | A1* | 11/2005 | Seo et al. | 455/566 |
| 2006/0015812 | A1* | 1/2006 | Cunningham et al. | 715/535 |
| 2006/0089147 | A1* | 4/2006 | Beaty | 455/445 |
| 2007/0073517 | A1* | 3/2007 | Panje | 702/181 |
| 2007/0101005 | A1* | 5/2007 | Shim et al. | 709/227 |
| 2007/0266090 | A1* | 11/2007 | Len | 709/204 |
| 2008/0040227 | A1* | 2/2008 | Ostermann et al. | 705/14 |
| 2008/0222687 | A1* | 9/2008 | Edry | 725/105 |
| 2009/0013265 | A1* | 1/2009 | Cole et al. | 715/758 |
| 2009/0019117 | A1* | 1/2009 | Bonforte et al. | 709/206 |
| 2009/0058860 | A1* | 3/2009 | Fong et al. | 345/467 |
| 2009/0094512 | A1* | 4/2009 | Szeto | 715/234 |
| 2009/0106376 | A1* | 4/2009 | Tom et al. | 709/206 |
| 2009/0124268 | A1* | 5/2009 | McNamara et al. | 455/466 |
| 2010/0031184 | A1* | 2/2010 | Kuhl et al. | 715/773 |
| 2010/0082751 | A1* | 4/2010 | Meijer et al. | 709/206 |
| 2010/0105438 | A1* | 4/2010 | Wykes et al. | 455/566 |

(Continued)

*Primary Examiner* — Ario Etienne
*Assistant Examiner* — Ho Shiu
(74) *Attorney, Agent, or Firm* — Larisa Migachyov

(57) ABSTRACT

A method for generating and using a video-based icon (videocon) in a message, where a videocon comprises a (preferably short) video and an associated code, comprising identifying the code within a message, retrieving the video associated with the code, inserting either the video or a link to the video into the message, and sending the message to its intended recipient.

19 Claims, 2 Drawing Sheets

(56) References Cited

U.S. PATENT DOCUMENTS

| | | | |
|---|---|---|---|
| 2010/0299400 A1* | 11/2010 | Durand et al. | 709/206 |
| 2010/0318622 A1* | 12/2010 | Granito et al. | 709/206 |
| 2011/0007077 A1* | 1/2011 | Kamath et al. | 345/473 |
| 2011/0010630 A1* | 1/2011 | Goldfarb et al. | 715/733 |
| 2011/0093272 A1* | 4/2011 | Isobe et al. | 704/258 |
| 2011/0148916 A1* | 6/2011 | Blattner | 345/619 |
| 2011/0176010 A1* | 7/2011 | Houjou et al. | 348/207.1 |
| 2011/0217998 A1* | 9/2011 | Lee | 455/466 |
| 2011/0282646 A1* | 11/2011 | Bill | 704/3 |
| 2012/0030038 A1* | 2/2012 | Russell et al. | 705/14.73 |
| 2012/0069028 A1* | 3/2012 | Bouguerra | 345/473 |
| 2012/0113011 A1* | 5/2012 | Wu et al. | 345/169 |
| 2013/0024781 A1* | 1/2013 | Douillet et al. | 715/752 |
| 2013/0050224 A1* | 2/2013 | Gehani et al. | 345/473 |
| 2014/0161356 A1* | 6/2014 | Tesch et al. | 382/196 |

* cited by examiner

S100:

```
S110  Generating a video-based icon
      S120  Receiving a video from a user
      S125  Automatically modifying the video
      S130  Associating the video with a code selected by the user S140  Using the video-based icon in a multimedia message
      S150  Identifying code inserted in the multimedia message by the user
      S160  Retrieving the video
      S170  Inserting the video into the multimedia message
```

FIG 1

METHOD FOR GENERATING AND USING A VIDEO-BASED ICON IN A MULTIMEDIA MESSAGE

CROSS-REFERENCE TO RELATED APPLICATIONS

The present application claims the benefit of U.S. Provisional Patent Application No. 61/530,679, filed Sep. 2, 2011, which is hereby incorporated by reference in its entirety.

TECHNICAL FIELD

This invention relates generally to the multimedia messaging field, and more specifically to a new and useful method for generating and using video-based icons in the multimedia messaging field.

BACKGROUND

Emoticons are commonly used to convey emotions in multimedia messaging. Currently, emoticons are limited in form to either letters and punctuation or cartoons. For example, ":)" may be used to convey 'satisfaction' or 'laughter' and ";p" may be used to convey 'teasing'. Alternatively, the cartoon "J" may be used to replace ":)" to convey 'satisfaction' or 'laughter'. Cartoon emoticons that convey a variety of emotions, such as happiness, sadness, curiosity, and anger, are available in various shapes and sizes, such as 'smileys' and 'pandas'. Some cartoon emoticons are also animated, such as a cartoon 'smiley' that 'winks' to suggest 'teasing' by transitioning from both eyes open to one eye open and one eye closed. Despite the wide variety of emoticons currently available, the user must choose amongst a limited set, which is often ineffective at conveying the complexity and uniqueness of the user or an emotion of the user. There is, thus, a need in the messaging field for a new and useful method for creating and using video-based icons in the messaging field. This invention provides such a new and useful method.

SUMMARY OF THE INVENTION

An object of the present invention is to provide a method for generating and using video-based icons in the messaging field. First, a video-based icon is generated. The video-based icon comprises a video (preferably a short one) and a code associated with the video. The code may be one or more ASCII characters such as :) or :( selected by the user to be associated with the video, or may be generated automatically. When the code is detected in the user's message, the video associated with the code is retrieved and inserted into the message. In an alternate embodiment of the invention, a link to the video may be inserted into the message instead of the video itself. The message is then sent to a recipient. When the recipient receives the message, the video is played. The video may be played automatically as soon as the message is opened, may be played only when the recipient clicks on the video, or may be played a predetermined time after the message is opened, said predetermined time calculated by estimating how long it would take the recipient to read the portion of the message preceding the video.

BRIEF DESCRIPTION OF THE FIGURES

FIG. 1 is a flowchart representation of a method of a first preferred embodiment of the invention.

DESCRIPTION OF THE PREFERRED EMBODIMENTS

Figure 2:
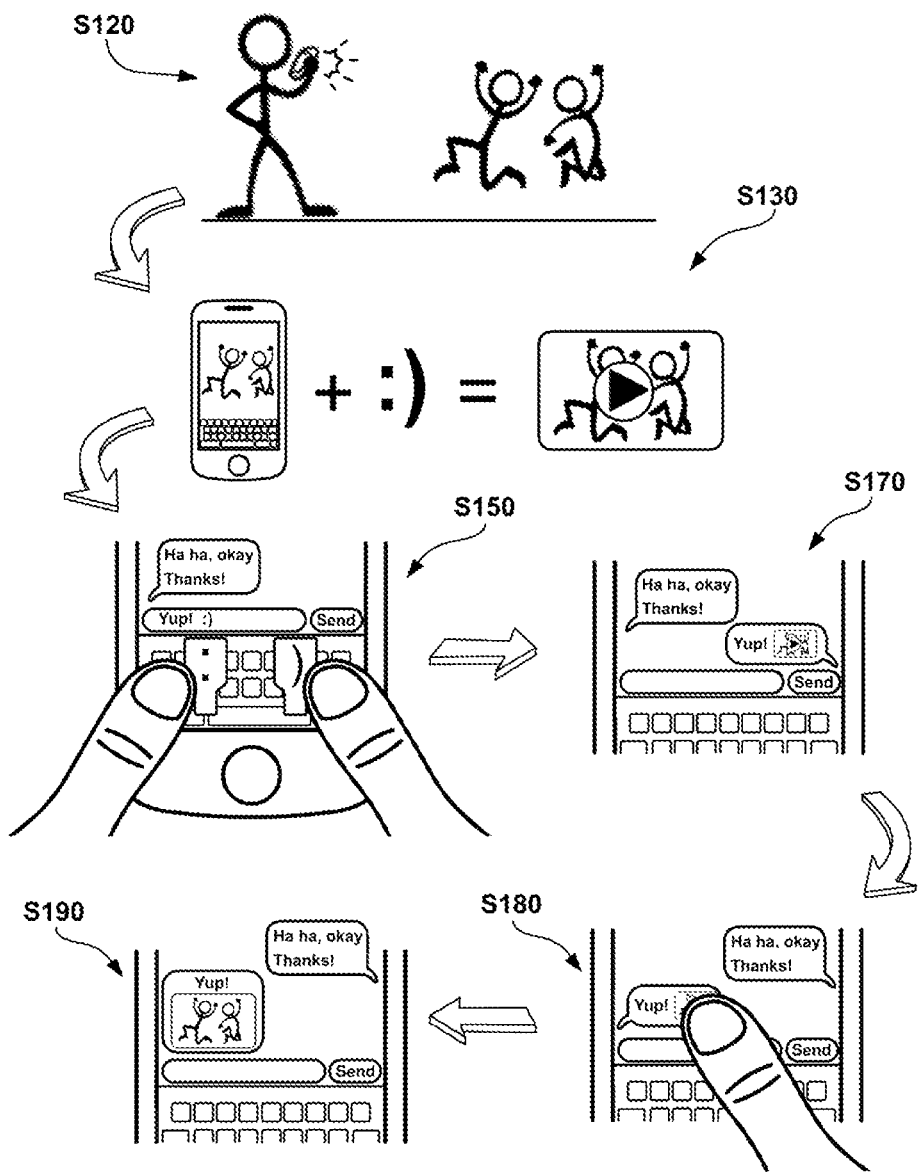
FIG. 2 is a flowchart representation of a variation of the first preferred embodiment of the invention.

The following description of the preferred embodiments of the invention is not intended to limit the invention to these preferred embodiments, but rather to enable any person skilled in the art to make and use this invention.

As shown in FIGS. 1 and 2, the method for generating and using a video-based icon (herein 'videcon') in a multimedia message on a multimedia communication device comprises the steps of generating a videcon S110 by receiving a video from a user S120 and associating the video with a first code selected by the user S130; and applying the videcon in the multimedia message S140 by identifying code inserted in the multimedia message by the user as associated with the video S150, retrieving the associated video S160, and inserting the associated video into the multimedia message S170. The method may further comprise the steps of creating the video in real time with a camera in communication with the multimedia communication device, downloading the video from a third party, and/or providing an application operating on the multimedia communication device, wherein the user may upload the video and select the code to generate the videcon from within the application. The method may also include the step of modifying the video, such as shortening and compressing the video or combining a segment from a first and second video to create the videcon. The method preferably also includes the step of providing a database that contains the videcon and other videcons such that the user and/or multimedia communication device may access the videcon for use in the multimedia message. The method may further comprise steps to play the videcon on a second multimedia communication device that receives the message from the first multimedia communication device, including sending the message, including the videcon to the second multimedia communication device S190. Finally, the method preferably includes steps to automatically insert the videcon in the message by detecting an emotion of the user as the user composes the message; alternatively, the method may include a step to automatically insert the videcon into the message by detecting a user gesture and associating the gesture with the videcon.

The method of the preferred embodiment includes the step of generating a videcon S110, wherein the videcon comprises a video segment associated with an emotion and configured to be inserted into a multimedia message. The emotion is preferably represented by a series of punctuation and/or alphanumeric characters that depict a facial expression. For example, the series of characters ';)' may indicate lightheartedness and therefore be associated with a video segment from a particularly funny scene in a comedic film. Alternatively, the emoticon may be represented by a series of punctuation and/or alphanumeric characters that depict a sound and/or response from the user. For example, the series of characters 'haha!' may indicate laughing and therefore be associated with a video of a baby laughing. However, the videcon may be associated with any other series of punctuation and/or alphanumeric characters that depict any other emotion and/or response from the user; the videcon may also or alternatively be associated with a user gesture, such as recorded and/or determined via a multi-touch touchpad or a camera. Furthermore, the video segment of the videcon is preferably of a limited length, such as three seconds, and/or of a limited digital file size, such as 100 kilobytes; however, the video segment of the videon may be of any other length and/or size.

The videon may be contained in a digital file, wherein the digital file contains at least the video segment and the associated punctuation and/or alphanumeric characters associated with the video; however, the digital file may contain additional information, such as when the video segment was created, who created the video segment, who associated the video segment with the emotion and/or response, a description of the emotion and/or response, or a information on and/or a pointer to the full-length video from which the video segment originated. However, the digital file that comprises the videcon may further comprise any other information. Because the videcon is preferably configured to be inserted into the multimedia message, the digital file comprising the videcon is preferably of a file type accessible by a plurality of multimedia communication devices. For example, the digital file may have a .avi, .flv, .gif, .mov, .mp3, .mp4, .mpg, .wav, or .wmv file extension or be of any other file type such that the videcon may be inserted into the multimedia message.

The method of the preferred embodiment includes the step of receiving a video from a user S120, wherein the video that is received is preferably a pre-existing video selected by the user. In a first variation, the user may open a web browser and navigate to a website that contains videos (e.g. Hulu.com, Netflix.com, or Facebook.com), wherein the user selects the video from the website. In this first variation, the user may download all of or a portion of the video from the website to the multimedia communication device on which the web browser operates. In a second variation, the user may select the video from a list of videos stored on the multimedia communication device, such as by navigating to a folder containing still images and videos and selecting the video from the group. In this second variation, a video may have been previously uploaded to the multimedia communication device or may have been generated by a camera arranged substantially on or connected to the multimedia communication device. For example, the multimedia communication device may be a smartphone with a camera, wherein the user navigates to a folder containing at least one video generated by the camera and therein selects the video from the folder. In a third variation, the user may select the video from a list of videos stored substantially remote from the multimedia communication device, such as from a cloud-based data storage system. Alternatively, the user may select the video prior to the creation of the video, such as by indicating that the selected video is to be subsequently generated by a camera arranged substantially on the multimedia communication device and then generating the video with the camera, as shown in FIG. 2. However, the video may be received and/or selected by any other method.

The method may further comprise the step of modifying the video, such as shortening the video, compressing the video, or combining the video with a segment of a second video such that the videcon comprises a plurality of video segments. For example, the user may wish to create the videcon from a particular scene from a full-length feature film and thus the user may select only the portion of the film that is desired. The user may further wish to combine two segments from two separate scenes from the film, and thus compile two selected segments of the film to create one video and then compress that video. The video may also or alternatively be visually enhanced in order to improve visual clarity when reduced in display size; the step of visually enhancing the video may include: 1) altering or eliminating the background in the video; 2) exaggerating features of objects shown in the video; 3) enhancing certain colors shown within the video; or 4) any other visual enhancement technique. The method may include the step of automatically (i.e. without an input from the user) compressing the video to within a predetermined maximum run time or a predetermined maximum file size. The method may further comprise the steps of checking that the run time of the video is not longer than a predetermined maximum run time and indicating to the user if the videcon run time is too long. The method may alternatively comprise the steps of checking that the file size time of the video is larger than a predetermined maximum run time and indicating to the user if the videcon file size is too large. The method may also comprise the step of modifying sound in the video, such as adding sound to the video, removing sound from the video, attenuating the sound in the video, and compressing the sound in the video. For example, the original sound in the video may be deleted and replaced with a second sound byte, wherein the second sound byte is a recording generated by a microphone of the multimedia communication device. The second sound byte may also be stripped from a portion of a second film or video. However, the step of altering the sound in the video may include any other type or form of alterations to the sound in the video, although the video may also have no sound, either when generated or when composed into the videcon.

The method of the preferred embodiment includes the step of associating the video with a first code selected by the user S130. The first code is preferably a series of punctuation and/or alphanumeric characters that depict an emotion and/or response that the user correlates with the video. The first code may also be a series of punctuation and/or alphanumeric characters that depict a facial expression that the user correlates with the video. The user preferably indicates the punctuation and/or alphanumeric characters to be associated with the video. Alternatively, the user may indicate an emotion, response, and/or facial expression that the user correlates with the video, wherein the method further comprises the step of generating the code such that the code is appropriately correlated to the emotion, response, and/or facial expression as indicated by the user. However, the method may further comprise the step of generating the first code and associating the first code with the video without an indication by the user of an emotion, response, or facial expression that the user correlates with the video. For example, the method may further comprise the steps of analyzing the video, determining at least one emotion, response, or facial expression correlated with the video, and generating the first code based upon the emotion, response, or facial expression determined to correlate with the video. The first code preferably functions to define a callout for the videcon, wherein inserting the first code or a form of the code into the message results in the insertion of the videcon into the message. However, the first code may have any other function, may be generated by any other method, and associated with the video by any other method.

The steps of generating the videcon may be conducted in a software program for sending and receiving messages and operating: on the multimedia communication device; in an application configured to generate the videcon and operating on the multimedia communication device, as shown in FIG. 2; in a web browser that accesses a website configured to generate the videcon; or in any other program configured to generate the videcon. In a first example, the step of generating the videcon S110 by receiving a video from the user S120 and associating the video with the first code selected by the user S130 are performed from within a desktop email client operating on a desktop computer. In a second example, the step of generating the videcon S110 is performed on a videcon production application operating on a smartphone. In the first and second examples, the mail client and/or application may, automatically or with permission from the user, upload the videcon to a remote server such that the videcon is accessible by the user from a plurality of multimedia communication devices and/or by a plurality of users. In a third example, the step of generating the videcon S110 is completed by the user when the user accesses a web page from within a web browser operating on a tablet, uploads the video and the first code to the web page, and selects an option to "create videcon". However, the videcon may be generated on any other device, program, and/or application.

The method may further comprise the step of storing the videcon such that the user may access the videcon at a later time. The videcon may be stored on the multimedia communication device, on a data storage device connected to the multimedia communication device, on a network to which the multimedia device is connected, on a remote server, on a cloud-based network, or on any other device or service configured to store data. In a first example, the videcon is stored on a data storage device (i.e. hard drive) arranged within the multimedia communication device and accessed by the user by opening a software program operating on the multimedia communication device, wherein the software program retrieves the videcon from the hard drive. In a second example, once the user creates the videcon, the user uploads the videcon to a remote server such that the videcon becomes available from a web-browser, software program, and/or application configured to access the remote server. In this second example, once the videcon is uploaded to the remote server, the videcon may become accessible to the user on a plurality of multimedia communication devices, such as any combination of a desktop computer, a laptop computer, a netbook, a tablet, a smartphone, an e-book reader, or any other device configured to send and/or receive multimedia messages. In a third example, the user may upload the videcon to a remote server, wherein the videcon becomes accessible by a second user such that the second user may insert the videcon in a second multimedia message composed by the second user. In this third example, the method may further comprise the step of providing the first user (who generated the videcon) with an award: for sharing the videcon (i.e. by uploading the videcon to the server for other users to access); each time a new user uses the videcon for the first time; and/or each time a second user uses the videcon. The award may be a monetary award, access to a second videcon from the second user, or any other type of award. The method may further comprise the step of adding the videcon to a videcon library. The videcon library may be accessible only to the user on one multimedia communication device, only to the user on a plurality of multimedia communication devices, to a plurality of users on one type of multimedia communication device, or, preferably, to a plurality of users on a plurality of multimedia communication devices and types of multimedia communication devices. The videcon library is preferably a database configured to store a plurality of videcons such that the user or users may access and use the videcons. The videcon may be added to the videcon library and/or retrieved from the videcon library through a web browser, through an application operating on the multimedia communication device, through a messaging client or server, or by any other application or program. The method may further comprise the step of placing the videcon in a category in the videcon library based upon an emotion or response associated with the videcon. Users of the videcon library may also rate videcons based upon user preference, based upon how well the videcon conveys the emotion or response, or based upon any other suitable rating system. The method may further comprise the steps of (1) embedding the videcon library into at least one program of a variety of programs, including word processing programs, spreadsheet programs, and presentation packages, and (2) providing user access to one videcon, a group or videcons, or the entire videcon library from within the program.

The method of the preferred embodiment includes the step of using the videcon in the multimedia message S140. The multimedia message may be an email sent through a desktop-based email client (e.g. Microsoft Outlook), an email sent through a browser-based email client (e.g. Gmail), a text message sent through a Short Message Service (SMS), a message sent through an instant messaging program (e.g. AOL Instant Messenger), a message sent through an online social network (e.g. Facebook), or any other type of multimedia message. A user may preferably create and/or read the multimedia message that contains the videcon on a multimedia communication device, such as a desktop computer, a laptop computer, a netbook, a tablet, a smartphone, an e-book reader, or any other device configured to send and/or receive multimedia messages. The videcon is preferably used by inserting the videcon into the body of the message, but may alternatively be inserted into a heading of the message, such as a subject line of the message, a signature of the user composing the message, or any other part of the message.

The method of the preferred embodiment includes the step of identifying code inserted in the multimedia message as associated with the video S150. The identified code may be substantially different than the first code or may be the same as or substantially similar to the first code (i.e. the same series of punctuation and/or alphanumeric characters comprising the first code). In the variation in which the identified code is substantially different than the first code, the step of identifying the code inserted in the multimedia message may include determining a mood, emotion, and/or response of the user generating the message; the determined mood, emotion, and/or response of the user may then be used to ascertain if the videcon may be appropriately inserted into the message. The mood, emotion, and/or response of the user may be determined by identifying keywords within the message; for example, if the body of the message contains the words 'angry' and 'upset', the method may include the step of checking that the videcon conveys the emotion of 'anger'. In the variation in which the code is the same as or substantially similar to the first code, the code inserted into the message may indicate that the videcon should also be inserted into the message, such as preceding the code, following the code, or replacing the code. Furthermore, the step of identifying the code inserted into the multimedia message preferably includes checking the message for the code as the user composes the message; alternatively, this step could include: checking the message for the code intermittently, such as every 30 seconds; after the user finishes composing the message and before the message is sent to a recipient; and/or after the user generates a request to check the message. The method may further comprise the step of prompting the user to accept or reject inserting the videcon into the message; if the user agrees, the videcon is preferably retrieved. Alternatively, the method may include the step of receiving a videcon selection from the user, wherein the user accessed the videcon library and therein chooses a videcon to insert into the message.

The method of the preferred embodiment includes the step of retrieving the associated video S160. Once the step of identifying code inserted into the multimedia message indicates that the videcon should be inserted into the message (and/or the user agrees to insert the videcon, or the user chooses a videcon to insert into the message), the videcon is preferably retrieved. The videcon may be retrieved from a data storage device arranged within the multimedia communication device, from a web browser directed to a web site, from a remote server, or from any other data storage device accessible by the multimedia communication device. Alternatively, instead of retrieving the videcon, a link to the videcon may instead be recalled. For example, in the variation in which the videcon is uploaded to and stored on a remote server, the link to the videcon rather than the videcon itself may be retrieved such that the recipient of the message does not receive the videcon but rather a link to the videcon; this has the added benefit of increasing speed of transmission of the message because the videcon is left on the remote server and is not sent to the user and then subsequently to the recipient, which may be unnecessary (i.e. wasted) data transfer.

The method of the preferred embodiment includes the step of inserting the videcon into the multimedia message S170. Once the videcon is retrieved, such as from a data storage device arranged in the multimedia communication device or from a remote server, the videcon is preferably inserted into the message. The videcon preferably replaces the identified, user-inserted code with the videcon, as shown in FIG. 2. However, the videcon may precede the inserted code or follow the inserted code. Alternatively, in the variation in which a link to the videcon is retrieved rather than the videcon itself, the inserted code may be preceded by, followed by, or replaced by the link to the videcon. However, the step of inserting the videcon or link to the videcon may be achieved by any other method.

The method may further comprise the step of sending the multimedia message to the recipient of the message S180. In the variation in which the videcon is retrieved and inserted into the message, both the body of the message and the videcon may be sent to the recipient. Alternatively, in the variation in which the videcon is stored on a remote server, the videcon may be retrieved and inserted into the message before the user sends the message to the recipient such that the user may review the message as the message will be seen by the recipient, but rather than sending the videcon to the recipient, only a link and/or pointer to the videcon is actually sent to the recipient; once the recipient receives the message and/or opens the message, the videcon may then be retrieved from the remote server and inserted into the message; this has the added benefit of reducing the amount of data transferred between the user and the recipient such that the message may be transferred from the user to the recipient in substantially less time. However, in the variation in which only the link is retrieved and inserted into the message, the message may be sent to the recipient such that the recipient only sees the link to the videcon in the message; alternatively, the videcon could be uploaded into the message once the recipient receives the message, wherein the videcon is based upon the link. In the variations in which the videcon is inserted into the multimedia message once the recipient accesses the message, the videcon video may play: once when the message is opened; continuously while the message is open; when the recipient clicks on the message or generates a request to play the video; or after a specified period of time. The specified period of time may be set by the user, but may also be ascertained via the additional step of determining how long after the message is opened to play the video. The step, for example, may include estimating the length of time that the recipient will require to read the portion of the message preceding the videcon (such as based on the length of text preceding the videcon) and the method may then further comprise the step of automatically playing the videcon once the estimated length of time has transpired after the recipient accesses the message. In the variation in which the videcon is not sent to the recipient but rather the link to the videcon, the method may further comprise the step of automatically accessing and playing the video: once when the message is opened; continuously while the message is open; when the recipient clicks on the link or generates the request to play the video; or after the specified period of time. The step of playing the video in the videcon S190 may then be conducted, such as: within the multimedia message, as shown in FIG. 2; within a video viewer within the messaging program, application, or web browser; within a video viewer external the messaging client; or within any other program configured to play a video. However, the videcon may be sent to and/or accessed by the recipient by any other method.

The method may further comprise the step of generating a tag of at least one of a person, a location, a reference, and/or an advertisable item viewable in the videcon. The step of generating the tag may include receiving a user input indicating any of the person, location, reference, and advertisable item. In a first example, the videcon may comprise a video segment from a feature film and the user may tag the name of an actor in the video segment and the film from which the video was taken. In a second example, the videcon may comprise a video of surfers and the user may tag the location of the beach on which the video was taken. In a third example, the videcon may comprise a video of a friend of the user drinking a soda and the user may tag the friend with a name and tag the soda as Coca-Cola. However, the step of generating the tag may be done automatically without an input from the user. In a variation of the step of tagging any of the person, the location, the reference, and the advertisable item viewable in the videcon, the method may further comprise the step of retrieving information associated with elements viewable in the video and using the information to generate a tag. For example, images tags available on a social networking site (such as Facebook) may be used to identify a person or location in the videcon. Alternatively, a database of advertisable items from manufactures and/or service providers such as Coca-Cola and AT&T may be used to identify and thus tag content in the videcon, such as a soda or mobile phone. In the variation in which the tags are generated automatically, the tags may be automatically attached to the videcon without explicit permission from the user, or the tags may only be attached when the user grants permission, either implicit or explicit. Alternatively, the tags may be suggested to the user and the user may permit some, prohibit some, edit some, and delete other tags. The tags are preferably made available to other users, such as when the videcon is sent to a recipient or when the videcon is uploaded to a videcon library on a remote server and other users retrieve the videcon from the videcon library.

As a person skilled in the art will recognize from the previous detailed description and from the figures and claims, modifications and changes can be made to the preferred embodiments of the invention without departing from the scope of this invention as defined in the following claims.

The invention claimed is:

1. A method for generating and using a video-based icon in a message generated by a first user on a first communication device, comprising:

generating a video-based icon comprising a video and a code associated with the video, said video-based icon generated by the first user;

storing the video-based icon in a database that it is available to at least two distinct types of communication devices and at least two different programs on each communication device;
identifying the code within the message;
retrieving the video associated with the code;
inserting one of the following group into the message:
the video;
a link to the video;
sending the message to a second user on a second communication device;
determining the amount of time it would take a user to read the portion of the message preceding the video; and
playing the video after a delay substantially equal to the amount of time it would take the user to read the portion of the message preceding the video, following the time that the second user opens the message.

2. The method of claim 1, further comprising one of the following group:
playing the video once when second user opens the message;
playing the video continuously when the second user opens the message;
playing the video when the second user clicks on a particular location in the message;
playing the video a predetermined time after the second user opens the message.

3. The method of claim 1, further comprising one of the following group of steps before the generating step:
creating a video;
downloading a video from a third party website;
combining a plurality of videos.

4. The method of claim 1, further comprising the following step after the generating step:
storing the video-based icon on a data storage device within the first communication device.

5. The method of claim 1, further comprising the following step after the generating step:
storing the video-based icon on a remote server and making it accessible to the first user via a variety of communication devices.

6. The method of claim 1, further comprising the following step after the generating step:
storing the video-based icon on a remote server in a video-based icon library and making it accessible to multiple users via a variety of communication devices.

7. The method of claim 1, where the code is selected by the first user.

8. The method of claim 1, where the code is generated automatically and inserted into the message by
analyzing the content of the user's message, said analyzing performed by considering at least one of the following factors: capitalization, punctuation, sentence length, font selection.

9. The method of claim 1, further comprising:
tagging the video-based icon with at least one of the following:
location, names of people, names of advertisable products.

10. The method of claim 1, where the video-based icon further comprises at least one of the following group:
information about who created the video;
information about who associated the video with the code;
information about any full-length video from which the video was taken.

11. The method of claim 7, where the video-based icon library further comprises a means of rating the video-based icons based on user preference.

12. The method of claim 7, where the video-based icon library further comprises a means of granting an award to a user who created a video-based icon.

13. The method of claim 1, where the video-based icon is inserted into the message in place of the code.

14. The method of claim 1, where the video-based icon is inserted into the message without deleting the code.

15. The method of claim 4, further comprising modifying the video.

16. The method of claim 4, further comprising:
comparing the total run time of the video with a predetermined maximum run time;
if the video is longer than the predetermined run time, reducing its length to a length that does not exceed the predetermined maximum run time.

17. The method of claim 1, further comprising:
storing the video-based icon in a video-based icon library and embedding the video-based icon library in at least 3 different programs.

18. The method of claim 4, further comprising adding sound to the video.

19. The method of claim 2, further comprising enlarging the video before it is played.

* * * * *